United States Patent
Croy et al.

(10) Patent No.: US 7,389,337 B2
(45) Date of Patent: Jun. 17, 2008

(54) MANAGEMENT OF NETWORK ELEMENTS USING A PROXY AGENT

(75) Inventors: Timothy Croy, Belfast (GB); Kevin Hamilton, Belfast (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 844 days.

(21) Appl. No.: 10/672,900

(22) Filed: Sep. 26, 2003

(65) Prior Publication Data
US 2005/0080886 A1  Apr. 14, 2005

(51) Int. Cl.
*G06F 15/173* (2006.01)
(52) U.S. Cl. .................. 709/223; 709/224; 370/400
(58) Field of Classification Search ........ 709/223–224, 709/230; 370/466, 400; 707/100
See application file for complete search history.

(56) References Cited

U.S. PATENT DOCUMENTS 6,708,207 B1 * 3/2004 Sabelhaus et al. .......... 709/223
6,731,625 B1 * 5/2004 Eastep et al. ............... 370/352
7,024,476 B1 * 4/2006 Page et al. .................. 709/224
2002/0184360 A1 * 12/2002 Weber et al. ............... 709/223

* cited by examiner

*Primary Examiner*—Frantz B. Jean
(74) *Attorney, Agent, or Firm*—Barnes & Thornburg

(57) ABSTRACT

A proxy agent for communicating data components between a Network Management System (NMS) which supports a first network management protocol, for example Simple Network Management Protocol (SNMP), and one or more network elements which support a second protocol, for example Transaction Language 1 (TL1). The proxy agent comprises a directory for storing the data components wherein each data component is associated with a first data component identifier which is compatible with the first protocol, and with a second data component identifier which is compatible with the second protocol. The directory provides an inherent mapping between protocols and obviates the need for a separate mapping component. The directory may conveniently comprise a Lightweight Directory Access Protocol (LDAP) directory.

18 Claims, 3 Drawing Sheets

MANAGEMENT OF NETWORK ELEMENTS USING A PROXY AGENT

FIELD OF THE INVENTION

The invention relates to communication between systems which support incompatible protocols using a proxy agent. The invention relates particularly, but not exclusively, to the management of network elements by a network management system.

BACKGROUND TO THE INVENTION

The Simple Network Management Protocol (SNMP) is an application layer network management protocol that enables management information to be exchanged between network elements (NEs) and a network management system (NMS). SNMP, which is part of the Transmission Control Protocol/Internet Protocol (TCP/IP) protocol suite, is defined in internet standard STD 15, RFC 1157.

Typically, an NMS manages a plurality of network elements each of which includes an SNMP agent. Each network element gathers management information pertaining to itself and in some cases the network around it. The SNMP agent makes this management information available to the NMS via SNMP.

SNMP may be used in a variety of telecommunication networks, or data communication networks, including Local Area Networks (LANs) or Wide Area Networks (WANs). Network elements, which are sometimes called network nodes or managed devices, may take a wide variety of forms including routers, access servers, hubs, computer hosts, printers, switches or bridges.

In some cases, an SNMP NMS may be required to manage network elements that do not support SNMP. In such cases a proxy agent, or proxy, is provided to mediate between the SNMP NMS and a non-SNMP network element. Conventionally, a respective proxy is devised for each type of non-SNMP network element. Such proxys are considered to be inflexible since they are configured specifically for a particular type of network element. As a result, conventional proxys cannot readily support changes in the network element, additional management features or changes to the Management Information Base (MIB) which stores the gathered management information.

It would be desirable, therefore, to provide a more flexible proxy agent.

SUMMARY OF THE INVENTION

Accordingly, a first aspect of the invention provides a proxy agent for communicating data components between a first system which supports a first protocol and a second system which supports a second protocol, said first and second protocols being mutually incompatible, the proxy agent comprising a directory for storing said data components wherein each data component stored in said directory is associated with a first data component identifier which is compatible with said first protocol, and with a second data component identifier which is compatible with said second protocol.

The directory provides an inherent mapping between protocols and obviates the need for a separate mapping component.

In one embodiment, the proxy agent includes a first protocol handler arranged to communicate with said first system using said first protocol, and a second protocol handler arranged to communicate with said second system using said second protocol, wherein said first protocol handler is arranged to send data components to, and/or receive data components from, said directory using said first data component identifier, and said second protocol handler is arranged to send data components to, and/or receive data components from, said directory using said second data component identifier.

The first and second protocol may each comprise a respective network management protocol. For example, said first protocol may comprise Simple Network Management Protocol (SNMP). The second protocol may comprise Transaction Language 1 (TL1).

In a typical embodiment, said first system comprises a Network Management system (NMS) and said second system comprises a network element.

Conveniently, said directory comprises a directory which supports Lightweight Directory Access Protocol (LDAP).

A second aspect of the invention provides a network comprising a first system which supports a first protocol and a second system which supports a second protocol, said first and second protocols being mutually incompatible, and a proxy agent of the first aspect of the invention.

A third aspect of the invention provides a method of communicating data components between said first system which supports a first protocol and a second system which supports a second protocol, said first and second protocols being mutually incompatible, said method comprising storing said data components in a directory wherein each data component stored in said directory is associated with a first data component identifier which is compatible with said first protocol, and with a second data component identifier which is compatible with said second protocol.

A fourth aspect of the invention provides a computer program product comprising computer program code for causing a computer to perform the method of the third aspect of the invention.

Other preferred, but not essential, features of the invention are recited in the dependent claims.

Further advantageous aspects of the invention will become apparent to those ordinarily skilled in the art upon review of the following description of a specific embodiment of the invention and with reference to the accompanying drawings.

The preferred features as described herein above or as described by the dependent claims filed herewith may be combined as appropriate, and may be combined with any of the aspects of the invention as described herein above or by the independent claims filed herewith, as would be apparent to those skilled in the art.

It is noted that the term 'protocol' is often used to refer to a set of one or more protocols. It will be understood, therefore, that the term 'protocol' as used herein is intended to embrace 'set of one or more protocols'.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
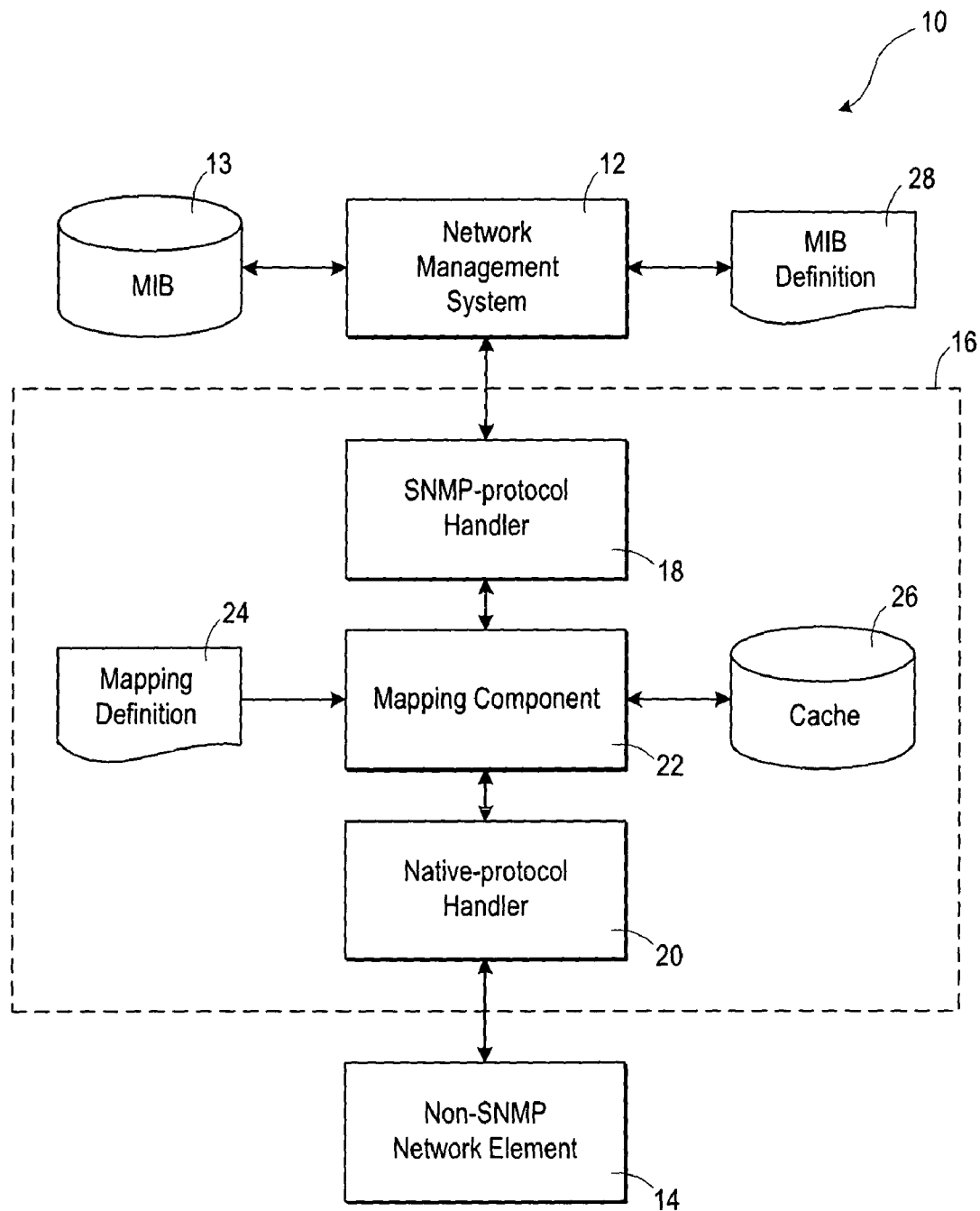
FIG. 1 presents a block diagram of part of a telecommunications network including a conventional proxy agent.

Referring now to FIG. 1 of the drawings, there is shown, generally indicated as 10, part of a telecommunications network. The network 10 includes a network management system (NMS) 12, which supports a first network management protocol, and one or more network elements (only one shown) 14 which support a second network management protocol (but not the first network management protocol). A typical network comprises one or more NMS managing a respective plurality of network elements, at least some of which may support a management protocol other than the management protocol supported by the NMS.

In the present example, it is assumed that the first network management protocol comprises SNMP. By way of example only, the second network management protocol is assumed to comprise Transaction Language 1 (TL1) as defined by Telcordia (formerly Bellcore). TL1 is commonly supported by the network elements of a synchronous transmission network such as a Synchronous Digital Hierarchy (SDH) network or a Synchronous Optical Network (SONET) network. Hence, a typical telecommunications network may comprise a plurality of LANs interconnected by one or more WAN, wherein the LANs comprise TCP/IP networks and hence support SNMP, while the WAN(s) comprise a SONET/SDH network supporting TL1. One or more NMS in the LANs may therefore need to be able to communicate with one or more network element of the WAN(s).

In order that the network element 14 may be managed by the NMS 12, a proxy agent, or proxy 16, is provided. A typical conventional proxy 16 comprises a respective component, or agent, for handling the first and second management protocols respectively. In the example of FIG. 1, the proxy 16 includes an SNMP agent, or protocol handler 18 and a native (in this example TL1) agent or protocol handler 20. The SNMP protocol handler 18, which typically comprises a software process, is arranged to communicate with the NMS via SNMP and in particular to respond to SNMP commands received from the NMS 12. The native protocol handler 20, which typically comprises a software process, is arranged for communication with its respective non-SNMP network element 14 using, in the present example, TL1.

The proxy 16 further includes a mapping component 22, which typically comprises a software process, which translates, or maps, data (e.g. comprising commands or responses) from the format of one network management protocol into a format compatible with the other network management protocol. The mapping component 22 uses mapping definitions to determine how data should be translated from one protocol format to the other. In the event of a change in functionality of the NMS or the network element 14, one or more new mapping definitions 24 are provided to the mapping component 22.

In some instances, the mapping component 22 may perform the required mapping in real-time. For example, if the mapping component 22 receives an SNMP GET-(or read) request from the SNMP protocol handler 18, it translates the request into a corresponding TL1 format using a pre-defined mapping definition. The resultant TL1 command is then sent to the network element 14 via the native protocol handler 20. The network element 14 responds to the native protocol handler 20 using TL1. The TL1 response is provided to the mapping component 22 whereupon the mapping component 22 translates the TL1 response into an SNMP compatible format using an appropriate mapping definition. The translated SNMP response is then provided to the NMS via the SNMP protocol handler 18. The proxy 16 is not always required to operate in real time and so, optionally, includes a cache memory 26 for storing translated data. The mapping component 22 retrieves the appropriate translated data when required by the NMS 12 or the network element 14.

The NMS 12 maintains a collection of information, or a database, commonly known as a Management Information Base (MIB) 13. The MIB 13 holds all of the management information gathered by the NMS 12. When a new network element is added to the network managed by the NMS 12, a respective MIB definition file 28 containing management information pertaining to the new network element is provided to the NMS 12 in order that the MIB 13 may be updated. An SNMP NMS 12 maintains an SNMP MIB and can access data in the SNMP MIB using SNMP commands.

Figure 2:
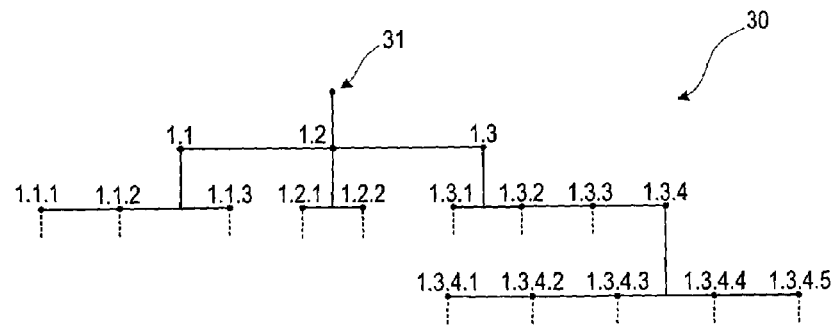
FIG. 2 presents a schematic representation of part of a MIB hierarchy.

A schematic representation of an SNMP MIB is shown in FIG. 2, generally indicated as 30. The SNMP MIB 30 exhibits a hierarchical, or tree-like, structure (typically with a nameless root) in which a plurality of managed objects are arranged hierarchically and each identified by a respective object identifier (OID). In FIG. 2, the managed objects are represented by the nodes of the tree structure and the OIDs are represented by the node labels 1, 1.1, 1.2, 1.3 and so on. The hierarchy 30 may be said to comprise a plurality of branches, each branch comprising one or more nodes. The first branch (which comprises nodes 1.1, 1.2 and 1.3 and forms the first level in the hierarchy) stems from a (typically unnamed) root node 31. The next level in the hierarchy comprises one or more branches (three shown in FIG. 2) stemming from one or other of the nodes of the first branch, and so on. A managed object, or MIB object, comprises data representing a characteristic or attribute of a network element managed by the NMS. Each managed object is uniquely identified by a respective OID. Hence, an SNMP MIB provides a hierarchical, or tree-like, model of a managed network. To be compatible with the SNMP MIB hierarchical structure, data stored in the SNMP MIB must exhibit a compatible hierarchical structure. SNMP may therefore be said to support a hierarchical, or tree-like, data structure.

Figure 3:
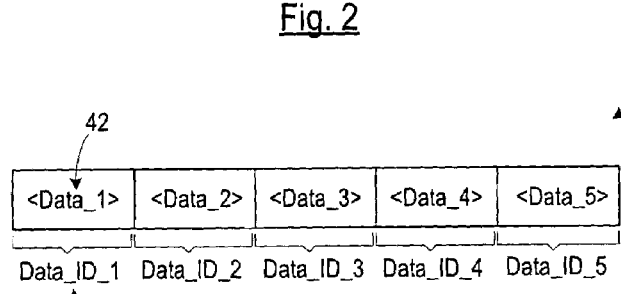
FIG. 3 presents a schematic representation of management information having a flat or linear structure.

In contrast, other network management protocols support non-hierarchical data structures. For example, TL1 supports a flat, or linear, data structure. FIG. 3 provides a schematic representation of management information 40 exhibiting a flat or linear data structure. The management information 40 comprises, by way of example only, five data components 42<Data_1>, <Data_2>, <Data_3>, <Data_4> and <Data_5> arranged in a linear fashion. Each data component 42 may, for example, represent a respective characteristic of a network element, or a characteristic of an aspect of the network element. Each data component 42 is associated with a respective data identifier 44 Data_ID_1, Data_ID_2, Data_ID_3, Data_ID_4 and Data_ID_5.

Referring again to FIG. 1, one of the tasks of the mapping component 22 is to receive data from the network element 14, via the native-protocol handler 20, in a linear data structure and to map, or associate, each data component 42 to a respective OID in accordance with a mapping definition. As a result, the data components 42 are compatible with a hierarchical data structure and therefore with SNMP. The mapping component 22 may then store the data components 42 and respective OIDs in the cache 26 and/or provide them to the NMS 12 via the SNMP protocol handler 18.

The operation of the mapping component 22 is relatively inflexible as it is dependant on a plurality of pre-defined mapping definitions. As a result, the proxy 16 is closely coupled to the network element 14 (or type of network element) with which it is associated. A respective separate proxy, and more particularly a respective separate mapping component, is required for each different type of network element (i.e. network elements which share common mapping definitions).

Figure 4:
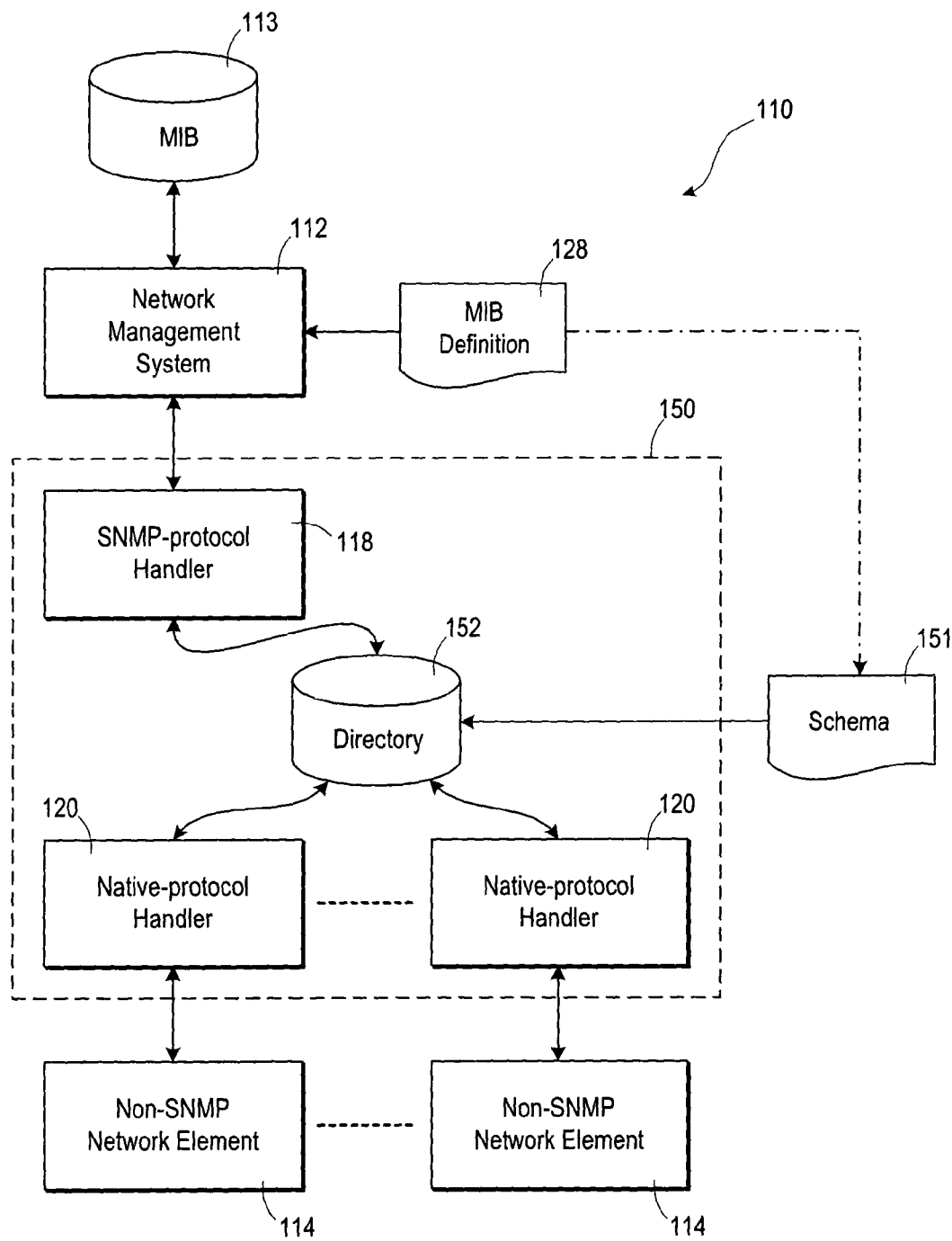
FIG. 4 presents a block diagram of part of a telecommunications network including a proxy agent embodying one aspect of the present invention.

FIG. 4 presents a block diagram of part of a telecommunications network 110 comprising a network management system 112, one or more network elements 114 (two shown in FIG. 4) and a proxy agent, or proxy 150 embodying one aspect of the invention. The network 110 is generally similar to the network 10 and similar numerals are used to denote similar components. In particular, the NMS 112 is assumed by way of example to comprise an SNMP NMS and the network elements 114 are assumed to support a non-SNMP network management protocol, namely TL1. Accordingly, The native protocol handlers 120 support TL1, while the protocol handler 118 communicating with the NMS 112 supports SNMP.

However, unlike proxy 16, proxy 150 does not comprise a mapping component operating on pre-defined mapping definitions. Rather, proxy 150 includes, or is associated with, a memory, or other storage means, in which the proxy 150 maintains a directory 152, or other collection of data, which inherently provides mapping functionality. In the embodiment of FIG. 4, the directory 152—which may be referred to as a network directory—is held in a cache memory, although other convenient storage devices may alternatively be used.

Figures 5A, 5B:
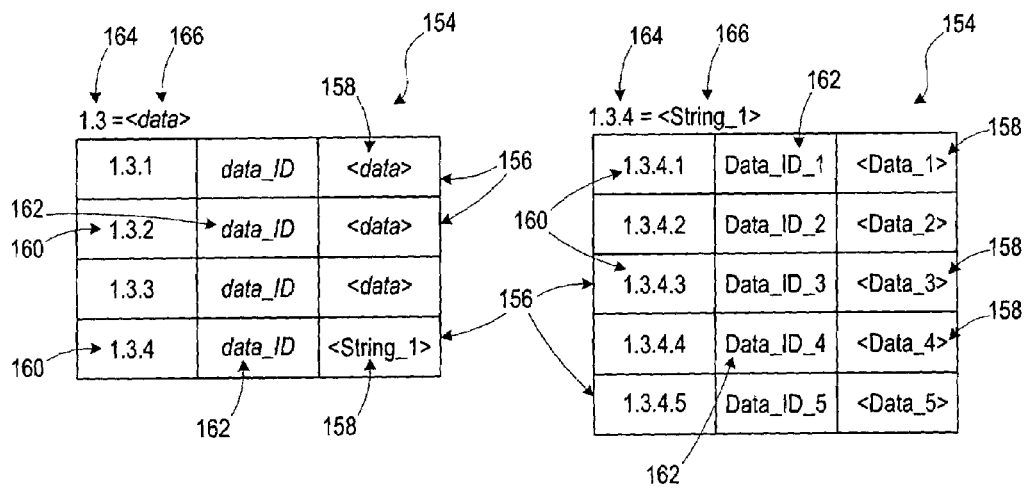
FIGS. 5A and 5B present a schematic representation of directory entities for use with the proxy agent of FIG. 4.

FIGS. 5A and 5B present schematic representations of a respective directory object or entity 154. Each directory entity comprises one or more directory entries 156. Each directory entry 156 comprises a respective data component 158, and at least two associated respective data component identifiers 160, 162. Each directory entity 154 is also associated with a respective entity identifier 164 which itself is associated with a respective data component 166.

At least one of the data component identifiers 160, 162 uniquely identifies the respective directory entry 156 within the directory 152. In the following description, it is assumed that the data component identifiers 160 provide this unique identification. Preferably, each data component identifier 160 comprises a respective hierarchical unique identifier, preferably an SNMP OID. Hence, the preferred directory 152 arranges its directory entries 156 in a hierarchical, or tree-like, manner. As a result, each directory entry 156 can be accessed using SNMP, or a similar hierarchical protocol. In the preferred embodiment, each entity identifier 164 also comprises a respective SNMP OID which corresponds with one hierarchical level above the SNMP OIDs of the data component identifiers 160. The corresponding data component 166 typically comprises a name, type or class of entity.

Hence, in the preferred embodiment, all of the directory entries 156 of a directory entity 154 share a common hierarchical level and share a common path to the root of the hierarchy, i.e. the directory entries 156 are grouped into entities 156 according to their respective positions in a hierarchy. Conveniently, the hierarchy corresponds with the hierarchy exhibited by the MIB maintained by the NMS. In the present example, the hierarchy exhibited by the directory 152 corresponds with the hierarchy of the SNMP MIB 113 maintained by the NMS 112. In the preferred embodiment, the directory 152 comprises at least one respective data entity 154 for each branch of the hierarchy.

The structure of each data entity 154 is determined by a respective entity template, or schema 151, which provides data fields for the entity identifier 164, data components 158, 166 and data component identifiers 160, 162 for each data entry 156. The entity structure provided for by a respective schema 151 corresponds with the structure of the respective hierarchical branch of the directory 152 that the resultant entity 154 is required to represent which, in turn, is determined by the characteristics of the corresponding network element, type or aspect of network element.

One or more respective schema 151 is created for each network element, or each type of network element. Each schema 151 is created with a respective OID, in particular a respective SNMP OID, assigned to each of its data component identifiers 160. In addition, a corresponding respective name, label or other identifier (typically in the form of a value or string) is assigned to each data component identifier 162 in a form that is compatible with the network management protocol supported by the network elements 114 (TL1 in this example). The correspondence between SNMP OIDs for use as data component identifiers 160 and TL1 identifiers for use as data component identifiers 162 may readily be derived from the information carried by the respective MIB definition(s) for each network element 114. Further, a respective OID, in particular a respective SNMP OID, is assigned to the entity identifier 164. The data component 166 corresponding to the entity identifier 164 is assigned a respective name, label or other identifier (typically in the form of a value or string) in a form that is compatible with the network management protocol supported by the network elements 114 (TL1 in this example). As a result, each entity 154 is identifiable by network elements 114 that support TL1 (by means of the data component 166) and by the NMS 112 and network elements that support SNMP (by means of the entity identifier 164).

The or each native protocol handler 120 is arranged to cause one or more directory entities 154 to be populated with the data it receives from the respective network element 114. More particularly, the or each native protocol handler 114 causes the respective data component 158 fields to be populated. The data component 158 fields are populated with corresponding data components 158 received from the respective network element 114. As a result, each data component 158 in a directory entity 154 is associated with a first identifier 162, which is compatible with the network management protocol supported by the respective network element 114 (e.g. TL1), and a second identifier 160, which is compatible with the network management protocol supported by the NMS 112 (e.g. SNMP). Once the schema 151 is populated, it becomes an entity 154 within the directory 152.

For a given set of data components received from a network element 114, the native protocol handler 120 determines which schema 151 to populate by means of the data component 166 associated with the entity identifier 164.

By way of example, assume that a network element 114 provides management information to the native protocol handler 120 according to the data structure shown in FIG. 3, i.e. five data components 42<Data_1> to <Data_5> each having a respective data identifier 44 Data_ID_1 to Data_ID_5. It is assumed that the NMS 112 has created a respective managed object, or node, in the MIB hierarchy in respect of each of the five data components 42 with respective OIDs 1.3.4.1, 1.3.4.2, 1.3.4.3, 1.3.4.4 and 1.3.4.5 (see FIG. 2). Accordingly, a respective schema 151 is created with the structure exhibited by the entity 154 of FIG. 5B. Each OID is assigned to a respective data component identifier 160 field as shown in FIG. 5B. Each data identifier 44 Data_ID_1 to Data_ID_5 is assigned to a respective data component identifier 162 field as shown in FIG. 5B. The OID 3.1.4 is assigned to the entity identifier 164 field and data (String_1 in this example) is assigned to the data component 166.

A respective management information identifier (not shown) is associated with each set of management information 40 that is produced by a network element 114. In the preferred embodiment, the data assigned to the data component 166 comprises the management information identifier used by the network element 114. In the present example, the management information identifier is assumed to comprise a data string, String_1. String_1 takes a form which is compatible with the network management protocol supported by the native protocol handler 120 and may thus be used by the native protocol handler 120 to identify the appropriate schema 151 into which the management information 40 should be written.

Hence, when the native protocol handler 120 receives management information 40 from the network element 114, it causes the management information 40 to be written into the schema 151 identified by the same identifier, in this case String_1, with which the management information 40 itself is associated. The data component identifiers 162 (each of which corresponds with a respective data identifier 44 of the management information 40) are used to determine into which respective data component 158 field each data component 42 of the management information 40 is written. In the preferred embodiment, the native protocol handler 120 arranges to management information 40 into a form where each data component 42 comprises a value or string assigned to a respective data identifier 44 and sends the paired information to the directory 152, or more particularly, to the module or process (not shown) that manages the reading and writing of data to and from the directory 152. The data components 42 are written to the appropriate data component 158 filed by matching the respective data identifiers 44 with the data component identifiers 162.

It is noted that the same schema 151 may be used in respect of different network elements, or aspects of network elements, which are of the same type with the result that more than one entity 154 having the same OIDs 160 may exist in the directory 152. Such entities may be distinguished from one another by means of a unique identifier, e.g. an identifier unique to the respective network element, included in the management information provided by the network element and therefore also included in the schema 151, typically as the first of the data components 158.

The SNMP protocol handler 118 may retrieve or receive data components 158 from a respective entity 154 in the directory 152 using SNMP since each data component 158 is associated with a respective SNMP OID 160. For example, the SNMP protocol handler 118 may be arranged to access the directory 152 using an SNMP GET (or read) command specifying a particular SNMP OID 160 and the data component 158 corresponding to the SNMP OID 160 is returned. In cases where the are more than one instances of the respective entity 154, a respective data component 158 corresponding to the same SNMP OID 160 may be returned in respect of each instance.

The preferred hierarchical structure of the directory 152 also allows data to be retrieved from the directory 152 using bulk SNMP GET (read) commands. For example, with reference to FIGS. 5A and 5B, a simple SNMP GET command directed to OID 1.3.4 returns the data value String_1. This information may be obtained either from the data entry for 1.3.4 of the (or each) entity 1.3 (FIG. 5A) or from the value assigned to the entity identifier 164 of entity 1.3.4. However, should a bulk SNMP GET command request all data components whose OID comprises the stem 1.3.4, this may conveniently be performed by returning all of the data components 158 from the (or each) entity 1.3.4.

Alternatively, the data components may be provided to the SNMP protocol handler 118 using an SNMP TRAP command. Typically, a directory management module (not shown), usually in the form of a software process, is associated with the directory 152 for managing read and write operations from and to the directory 152. The directory management module may be arranged to detect updates to the directory 152 and to communicate the updated information, i.e. update data components 158 and associated OIDs, to the SNMP protocol handler 118 using an SNMP TRAP command.

All of the information received by the SNMP protocol handler 118 may be communicated to the NMS 112 using SNMP in conventional manner in order that the MIB 113 may be maintained.

In the preferred embodiment, the directory 152 comprises an LDAP (Lightweight Directory Access Protocol) directory, i.e. a directory that supports LDAP. LDAP is a directory access protocol defined in standard RFC 1777. Each entry in an LDAP directory may comprise one or more data components and is associated with a first name (usually referred to as a distinguished name) which uniquely identifies the directory entry, and a second name (usually referred to as a type). Moreover, LDAP directory entries are arranged in a hierarchical structure comparable to the structure described above in respect of directory 152. Hence, an LDAP directory may readily be used to provide the directory 152, wherein the distinguished name of each directory entry may be used to provide the OID 160 and the second name (or type) may be used to provide the data component identifiers 162. Accordingly, LDAP schemas may be used to provide the schemas for the directory entities 154 described above. Conveniently, conventional LDAP schemas, upon creation, are already associated with positions in the MIB hierarchy.

Hence, in the preferred embodiment, MIB definition files 128 are used to create one or more corresponding LDAP schema 151 which, when populated by data received from a network element, provide directory entities which are stored in an LDAP directory. Because of the dual naming, or identifier, facility afforded by LDAP directory entries, the LDAP directory serves not only as a cache memory for management information, but also as a means for providing convenient mapping between two different network management protocols.

More generally, the directory 152 inherently provides a mapping between two different network management protocols (SNMP and TL1 in the present example) because each data component 158 is associated with two identifiers 160, 162, one being compatible with one network management protocol and the other being compatible with the other network management protocol. In addition, the directory 152 provides the function of the cache memory 26 (FIG. 1). The proxy 150 does not therefore require a mapping component similar to that described with reference to FIG. 1.

As a result, the proxy 150 is relatively flexible and may support not only more than network element but also more than one type of network element (i.e. network elements that provide different types or structures of management information)—a respective MIB definition file 128 is provided to the NMS 112 in respect of each type of network element 114 from which appropriate schemas are generated. Once the appropriate schemas are generated, the respective types of network element 114 can be managed by the NMS in the manner described above. Similarly, the proxy 150 readily supports modifications or updates to network elements, or any other changes which result in a new or modified MIB 113.

The foregoing description primarily describes communication of management information from the network elements 114 to the NMS 112 via the directory 152. It will be understood however that communication of management information between the network elements 114 and the NMS 112 may be bi-directional. The dual naming characteristic of the directory 152 readily allows both the NMS 112 and the network elements 114 to send information to and receive information from the directory 152.

It will further be understood that the invention is not limited to networks in which only two different types of network management protocols are used. The embodiment may readily be extend to support three or more otherwise incompatible network management protocols by providing a respective data component identifier in each directory entity for each network management protocol to be supported.

The invention is not limited to the network management protocols SNMP and/or TL1. Moreover, the invention may be used with protocols other than network management protocols. Further, the invention is not limited to communication between an NMS and one or more network element—the invention also has application between network elements supporting different protocols. In general, the invention may be applied where communication is required between two or more systems or devices which support different, or incompatible, protocols, or do not at least support one suitable protocol in common.

The invention is not limited to the embodiment described herein which may be modified or varied without departing from the scope of the invention.

The invention claimed is:

1. A proxy agent for communicating data components between a first system which supports a first protocol and a second system which supports a second protocol, said first and second protocols being mutually incompatible, the proxy agent comprising a directory for storing said data components, said directory supporting a hierarchical data structure, wherein each data component stored in said directory is associated with a first data component identifier which is compatible with said first protocol, and with a second data component identifier which is compatible with said second protocol, and wherein each stored data component is associated with a respective position in the hierarchical data structure.

2. A proxy agent as claimed in claim 1, further including a first protocol handler arranged to communicate with said first system using said first protocol, and a second protocol handler arranged to communicate with said second system using said second protocol, wherein said first protocol handler is arranged to send data components to, and/or receive data components from, said directory using said first data component identifier, and said second protocol handler is arranged to send data components to, and/or receive data components from, said directory using said second data component identifier.

3. A proxy agent as claimed in claim 1, wherein said respective first data component identifiers support a hierarchical structure and serve to identify the respective position of the respective data component in the hierarchical data structure.

4. A proxy agent as claimed in claim 3, wherein said data components are arranged into directory entities within the directory, each directory entity comprising a one or more directory entries, each directory entry comprising a respective data component, a respective first data component identifier and a respective second data component identifier.

5. A proxy agent as claimed in claim 4, wherein each data component within a directory entity belongs to the same branch of the hierarchical data structure.

6. A proxy agent as claimed in claim 4, wherein each directory entity is associated with a first directory entity identifier which is compatible with said first protocol and with a second identifier which is compatible with said second protocol.

7. A proxy agent as claimed in claim 6, in which said respective first directory entity identifiers support a hierarchical structure.

8. A proxy agent as claimed in claim 6, in which each of said first directory entity identifiers belongs to a branch of the hierarchical data structure that is one hierarchical level above the branch to which the respective data components in the respective directory entity belong.

9. A proxy agent as claimed in claim 4, in which a respective schema is provided to define each type of directory entity and wherein a respective directory entry is created by populating a respective schema with one or more data components.

10. A proxy agent as claimed in claim 1, wherein said first protocol supports a hierarchical data structure.

11. A proxy agent as claimed in claim 1, wherein said first and second protocol each comprise a respective network management protocol.

12. A proxy agent as claimed in claim 1, wherein said first protocol comprises Simple Network Management Protocol (SNMP).

13. A proxy agent as claimed in claim 1, wherein said first system comprises a Network Management system (NMS) and said second system comprises a network element.

14. A proxy agent as claimed in claim 13, wherein said proxy agent effects communication between said Network Management system and a plurality of network elements, at least some of said network elements supporting said second protocol.

15. A proxy agent as claimed in claim 1, wherein said directory comprises a directory which supports Lightweight Directory Access Protocol (LDAP).

16. A network comprising a first system which supports a first protocol and a second system which supports a second protocol, said first and second protocols being mutually incompatible, and a proxy agent as claimed in claim 1.

17. A method of communicating data components between said first system which supports a first protocol and a second system which supports a second protocol, said first and second protocols being mutually incompatible, said method comprising storing said data components in a directory, said directory supporting a hierarchical data structure, wherein each data component stored in said directory is associated with a first data component identifier which is compatible with said first protocol, and with a second data component identifier which is compatible with said second protocol, and wherein each stored data component is associated with a respective position in the hierarchical data structure.

18. A computer program product comprising machine-readable instructions which when executed in a computer cause said computer to perform the method of claim 17.

* * * * *